D. MORIARTY.
VEHICLE TIRE.
APPLICATION FILED JULY 20, 1918.
1,334,110.
Patented Mar. 16, 1920.
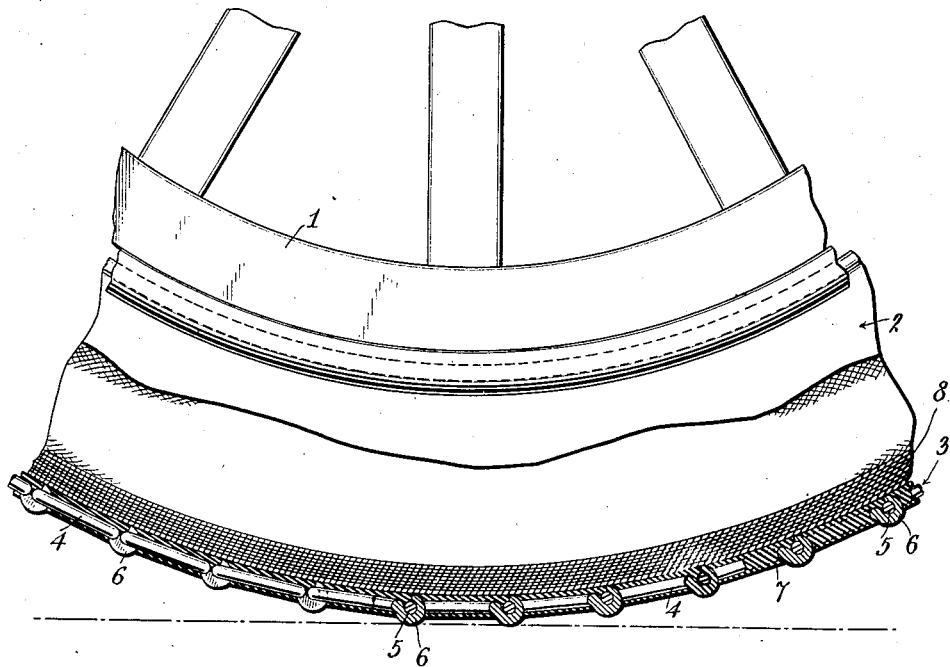
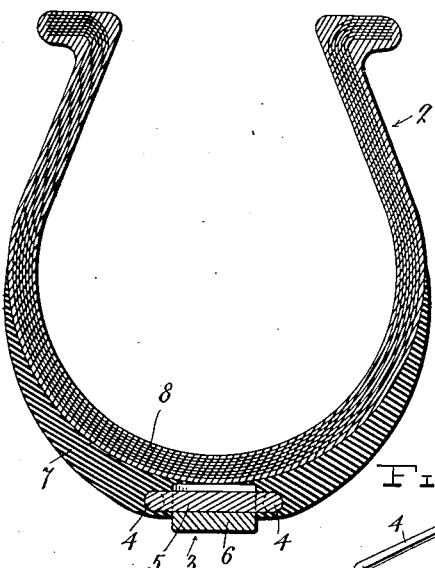
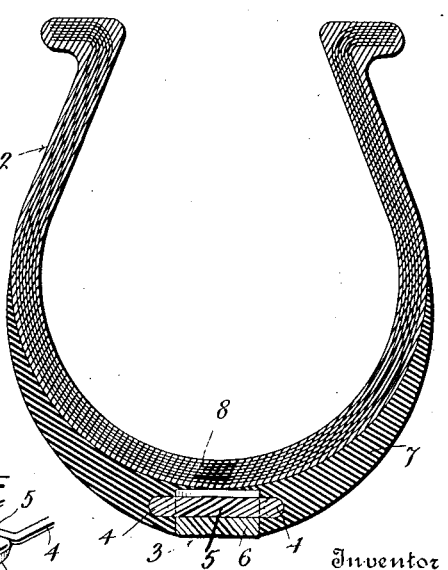
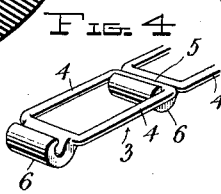
Inventor
Daniel Moriarty,
Witnesses
By
Attorney

UNITED STATES PATENT OFFICE.

DANIEL MORIARTY, OF OAKLAND, CALIFORNIA.

VEHICLE-TIRE.

1,334,110.     Specification of Letters Patent.     Patented Mar. 16, 1920.

Application filed July 20, 1918. Serial No. 245,898.

*To all whom it may concern:*

Be it known that I, DANIEL MORIARTY, a citizen of the United States, residing at Oakland, in the county of Alameda and State of California, have invented new and useful Improvements in Vehicle-Tires, of which the following is a specification.

The present invention relates to improvements in vehicle tires, and more especially to those of the pneumatic type, and the primary object of the invention is to increase the durability of tires of this kind by providing the tire with an endless metal linked member or chain of a particular construction which is embedded in the tread of the tire, the linked member or chain presenting cross members which are exposed at the tread of the tire and preferably project outwardly therefrom and having side or circumferentially extending portions which are offset inwardly relatively to the cross members and are wholly embedded in or covered by the rubber composing the tread of the tire. According to the present invention, the weight on the tire is sustained by the exposed transverse portions of the metal linked member or chain, and hence a durable wearing surface is afforded for the tire. Furthermore, by reducing the area of contact between the tire and the ground to the transverse portions of the linked member or chain, less resistance is offered to the rolling action of the tire and internal heating of the tire is reduced to a minimum.

To these and other ends, the invention consists in certain improvements, and combinations and arrangements of parts, all as will be hereinafter more fully described, the novel features being pointed out particularly in the claims at the end of the specification.

In the accompanying drawing:

Figure 1 is a side elevation of the lower portion of a vehicle wheel equipped with a pneumatic tire constructed in accordance with the present invention, the tread portion of the tire being shown in section.

Fig. 2 represents a transverse section of the tire as shown in Fig. 1.

Fig. 3 is a view similar to Fig. 2 showing a somewhat modified embodiment of the invention, and Fig. 4 is a detail perspective view of a portion of the linked member or chain.

Similar parts are designated by the same reference characters in the several views.

The present invention is applicable generally to vehicle tires of both the solid and pneumatic types, although it is especially adapted for use in connection with pneumatic tires for the purpose of increasing the durability thereof. The preferred embodiments of the invention are shown in the accompanying drawing and will be hereinafter described in detail, but it is to be understood that equivalent constructions are contemplated and will be included in so far as they come within the scope of the claims.

In the present instance, 1 designates a portion of a wheel and 2 designates a portion of a pneumatic tire fitted thereto. According to the present invention, a linked member or chain 3 of metal extends circumferentially of the tread of the tire, it constitutes a part of the tire casing, and it is embedded in the rubber compound or material composing the tread of the tire. This linked member or chain is preferably of the construction shown in detail in Fig. 4, each link comprising a substantially rectangular body having side members 4, an end member 5, and a knuckle 6, these parts of each link being spaced to form a relatively large central opening in the link, and the end member 5 of each link is attachable and detachable with respect to the knuckle of an adjacent link by relative lateral movement between the links. The closed side of each knuckle, it is to be understood, is offset from the plane of the side members 4 and the end member 5 of the link. In applying the linked member or chain to the tire, this linked member or chain is molded or otherwise embedded in the rubber compound 7 which is applied to the tread portion of the tire and at the outer side of the usual fabric body 8, the linked member or chain preferably lying against the outermost ply of the fabric body and the knuckles 6 are directed outwardly. The rubber compound composing the tread of the tire completely covers the side members 4 of the links and partially covers the outwardly projecting knuckles 6. In some instances, the rubber compound may be filled in to a depth substantially flush with the knuckles as shown in Fig. 3, leaving these knuckles exposed on the tread of the tire but flush with the rubber compound composing the tread. It is generally preferable, however, to so dispose the rubber compound composing the tread of the tire as to leave the knuckles 6 projecting outwardly beyond the tread, as shown in Figs. 1 and 2, the side members 4 of the links being, however, wholly embedded in and covered by the rubber compound composing the tread. By molding the metal linked member or chain in the rubber compound composing the tread of the tire, this linked member or chain will be vulcanized therein and will constitute an inseparable part of the tire.

Pneumatic tires constructed in accordance with the present invention will present a minimum surface to the ground or road surface, the contact between the tire and the ground being confined primarily to the knuckles of the linked member or chain. In consequence, internal friction in the tire and drag between the tire and the ground or road surface will be reduced to a minimum, and, owing to the durability of the linked member or chain, the life of the tire will be materially lengthened.

I claim as my invention:

1. A vehicle tire having a linked member extending circumferentially and embedded and vulcanized in the tread thereof, said linked member presenting transversely extending circumferentially spaced portions which are exposed at the tread of the tire and intervening circumferentially extending portions which are offset inwardly with respect to said transverse portions and are wholly embedded in and covered by the tread of the tire.

2. A vehicle tire having a tread, and a chain extending circumferentially and embedded and vulcanized in its tread, the chain having transverse knuckles which project outwardly beyond the surface of the tread at circumferentially spaced intervals, the chain also having circumferential portions which intervene between and are offset inwardly relatively to said knuckles and are wholly embedded in and covered by the material composing the tread of the tire.

In testimony whereof I have hereunto set my hand in presence of two subscribing witnesses.

DANIEL MORIARTY.

Witnesses:
C. A. BATEMAN,
CHAS. S. HYER.